(12) United States Patent
Graziosi

(10) Patent No.: US 10,735,766 B2
(45) Date of Patent: Aug. 4, 2020

(54) POINT CLOUD AUXILIARY INFORMATION CODING

(71) Applicant: SONY CORPORATION, Tokyo (JP)

(72) Inventor: Danillo Graziosi, San Jose, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/408,099

(22) Filed: May 9, 2019

(65) Prior Publication Data

US 2020/0195967 A1  Jun. 18, 2020

Related U.S. Application Data

(60) Provisional application No. 62/780,745, filed on Dec. 17, 2018.

(51) Int. Cl.
*G06T 9/00* (2006.01)
*H04N 19/597* (2014.01)
*H04N 19/182* (2014.01)
*H04N 19/176* (2014.01)
*H04N 19/91* (2014.01)
*H04N 19/80* (2014.01)

(52) U.S. Cl.
CPC ......... *H04N 19/597* (2014.11); *H04N 19/176* (2014.11); *H04N 19/182* (2014.11); *H04N 19/80* (2014.11); *H04N 19/91* (2014.11)

(58) Field of Classification Search
CPC .... H04N 19/597; H04N 19/91; H04N 19/176; H04N 19/182; H04N 19/80
See application file for complete search history.

(56) References Cited

U.S. PATENT DOCUMENTS

| 2017/0249401 | A1* | 8/2017 | Eckart | G06F 17/18 |
| 2018/0268570 | A1* | 9/2018 | Budagavi | G06T 9/001 |
| 2018/0348343 | A1* | 12/2018 | Achour | H01Q 3/44 |

FOREIGN PATENT DOCUMENTS

EP   3 349 182 A1   7/2018

OTHER PUBLICATIONS

Dorina Thanou et al.,"Graph-based compression of dynamic 3D point cloud sequences", arXiv:1506.06096v1 [cs.CV] Jun. 19, 2015, pp. 1-13.
Julien Richard et al.,"Block to patch index coding", 122. mpeg mettings; Apr. 16, 2018-Apr. 20, 2018; San Diego; (Motion Picture Expert Group or ISO/IEC JTC1/SC29/WG11), No. m42629, Apr. 12, 2018 (Apr. 12, 2008), XP030070968, section 3.

(Continued)

*Primary Examiner* — Howard D Brown, Jr.
(74) *Attorney, Agent, or Firm* — Haverstock & Owens LLP

(57) ABSTRACT

A method for coding auxiliary information of 3D point cloud data is described herein. The coding method utilizes 3D surface patches to represent point clouds, and performs flexible mapping of 3D patch surface data into 2D canvas images. Auxiliary data is transmitted in order to correctly identify and reconstruct the 3D patches from 2D information. The auxiliary data is encoded using a video encoder.

17 Claims, 4 Drawing Sheets

(56) References Cited

OTHER PUBLICATIONS

Danillo Graziosi (Sony): "V-PCC New Proposal [CE2.18-related] block2Patch Video Coding", 125. MPEG Meeting; Jan. 14, 2019-Jan. 18, 2019; MARREKECH; (motion picture expert group or ISO/IEC JTC1/SC29/WG11), No. m46217 Jan. 10, 2019 )Jan. 10, 2019), XP030214759, Retrieved from the Internet: URL:http://phenix.int-evry.fr/mpeg/doc end_user/documents/125_Marrakech/wg11/m46217-v1-m46217.zip m46217.docx [retrieved on Jan. 10, 2019] section 3.

"PCC Test Model Category 2 v1" 121. MEPG Meeting; Jan. 22, 2018-Jan. 26, 2018; Gwangju; (Motion Picture Expert Group or ISO/IEC JTC1/SC29-WG11),, No. N17348, Apr. 16, 2018 (Apr. 16, 2018), XP030023995, sections 2, 3.6, 3.7.

International Search Report and Written Opinion dated Jan. 2, 2020 for PCT Application No. PCT/IB2019/058668.

\* cited by examiner

POINT CLOUD AUXILIARY INFORMATION CODING

CROSS-REFERENCE TO RELATED APPLICATION(S)

This application claims priority under 35 U.S.C. § 119(e) of the U.S. Provisional Patent Application Ser. No. 62/780,745, filed Dec. 17, 2018 and titled, "POINT CLOUD AUXILIARY INFORMATION CODING," which is hereby incorporated by reference in its entirety for all purposes.

FIELD OF THE INVENTION

The present invention relates to three dimensional graphics. More specifically, the present invention relates to coding of three dimensional graphics.

BACKGROUND OF THE INVENTION

Point clouds have been considered as a candidate format for transmission of 3D data, either captured by 3D scanners, LIDAR sensors, or used in popular applications such as Virtual Reality/Augmented Reality (VR/AR). Point Clouds are a set of points in 3D space. Besides the spatial position (X,Y,Z), each point usually has associated attributes, such as color (R,G,B) or even reflectance and temporal timestamps (e.g., in LIDAR images). In order to obtain a high fidelity representation of the target 3D objects, devices capture point clouds in the order of thousands or even millions of points. Moreover, for dynamic 3D scenes used in VR/AR application, every single frame often has a unique dense point cloud, which results in the transmission of several millions of point clouds per second. For a viable transmission of such a large amount of data, compression is often applied.

In 2017, MPEG issued a call for proposal (CfP) for compression of point clouds. After evaluation of several proposals, MPEG is considering two different technologies for point cloud compression: 3D native coding technology (based on octree and similar coding methods), or 3D to 2D projection, followed by traditional video coding. In the case of dynamic 3D scenes, MPEG is using a test model software (TMC2) based on patch surface modeling, projection of patches from 3D to 2D image, and coding the 2D image with video encoders such as HEVC. The method has proven to be more efficient than native 3D coding and is able to achieve competitive bitrates at acceptable quality.

When coding point clouds, TMC2 encodes auxiliary information related to the patch projection, such as patch position in the 2D canvas image and bounding box size. For temporal coding of auxiliary information, patch matching between patches from current point cloud and patches from the immediately decoded point cloud is used for prediction. The procedure is limited to the immediate neighbor and includes performing delta coding for all the frames in the sequence.

The state-of-the-art in point cloud compression using video encoders represents point clouds as 3D patches and encodes a 2D image formed by the projection of geometry and attributes into a 2D canvas. The packing of projected 3D patches into a 2D image is also known as 2D mapping of 3D point cloud data. Currently, the process allows for patch placement such that there might be some ambiguity in the ownership of the block. The ownership of the blocks is sent to the decoder as auxiliary information. However, the information is not being coded using video encoders, but directly using the entropy coding proposed in the standards.

SUMMARY OF THE INVENTION

A method for coding auxiliary information of 3D point cloud data is described herein. The coding method utilizes 3D surface patches to represent point clouds, and performs flexible mapping of 3D patch surface data into 2D canvas images. Auxiliary data is transmitted in order to correctly identify and reconstruct the 3D patches from 2D information. The auxiliary data is encoded using a video encoder.

In one aspect, a method programmed in a non-transitory memory of a device comprises converting point cloud information into two dimensional information, including auxiliary information related to the point cloud information in an occupancy map and encoding the two dimensional information and the occupancy map including the auxiliary information using a video encoder. The auxiliary information includes information to indicate to which bounding box a pixel belongs. An indicator indicating an owner of the bounding box is inserted into a candidate list. The candidate list is added to upper bits of the occupancy map. The candidate list is added to upper bits of a luminous channel of a video coding stream. The auxiliary information is only provided when bounding boxes overlap. The method further comprises decoding the two dimensional information and the auxiliary information to regenerate the point cloud information.

In another aspect, an apparatus comprises a non-transitory memory for storing an application, the application for: converting point cloud information into two dimensional information, including auxiliary information related to the point cloud information in an occupancy map and encoding the two dimensional information and the occupancy map including the auxiliary information using a video encoder and a processor coupled to the memory, the processor configured for processing the application. The auxiliary information includes information to indicate to which bounding box a pixel belongs. An indicator indicating an owner of the bounding box is inserted into a candidate list. The candidate list is added to upper bits of the occupancy map. The candidate list is added to upper bits of a luminous channel of a video coding stream. The auxiliary information is only provided when bounding boxes overlap. The apparatus further comprises decoding the two dimensional information and the auxiliary information to regenerate the point cloud information.

In another aspect, a system comprises an encoder configured for: converting point cloud information into two dimensional information, including auxiliary information related to the point cloud information in an occupancy map and encoding the two dimensional information and the occupancy map including the auxiliary information using a video encoder and a decoder configured for decoding the two dimensional information and the auxiliary information to regenerate the point cloud information. The auxiliary information includes information to indicate to which bounding box a pixel belongs. An indicator indicating an owner of the bounding box is inserted into a candidate list. The candidate list is added to upper bits of the occupancy map. The candidate list is added to upper bits of a luminous channel of a video coding stream. The auxiliary information is only provided when bounding boxes overlap.

DETAILED DESCRIPTION OF THE PREFERRED EMBODIMENT

A novel method for coding auxiliary information of 3D point cloud data is described herein. The coding method utilizes 3D surface patches to represent point clouds, and performs flexible mapping of 3D patch surface data into 2D canvas images. Auxiliary data is transmitted in order to correctly identify and reconstruct the 3D patches from 2D information. A method of transmitting the auxiliary data information based on video encoders is described herein.

Patches representing geometry and attributes such as textures are placed in 2D canvases, where the placement of each patch may overlap each other's bounding boxes, given that the active content does not overlap. This may cause some ambiguity in the ownership of the blocks in the canvas image. The current standard handles the ambiguity by generating a list of candidates for each block, and sending the index in the candidate list of the owner of the block. The transmission is simply entropy coding the index and sending it in the auxiliary data information (on an auxiliary channel). The coding method described herein includes transmitting this information by using the video encoder. The video encoders transmits the auxiliary information for patch reconstruction. The block2Patch information is inserted into an occupancy map.

A solution is to constrain the patch placement so that this ambiguity does not exist, and the auxiliary information does not need to be sent. However, this limits the patch placement, which could impact performance and memory allocation.

Figure 1:
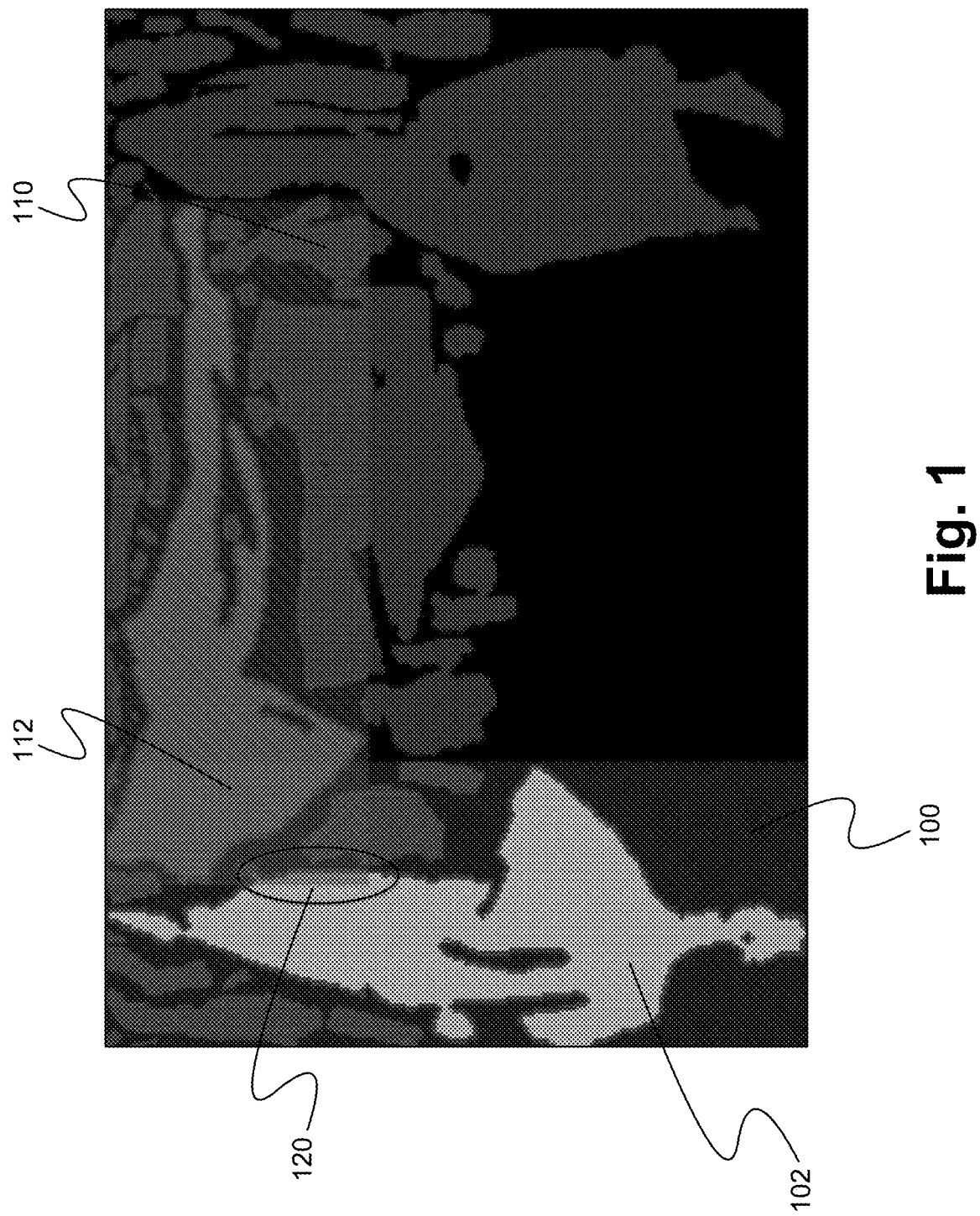
FIG. 1 illustrates an image with two overlapping bounding boxes according to some embodiments.
Figure 2:
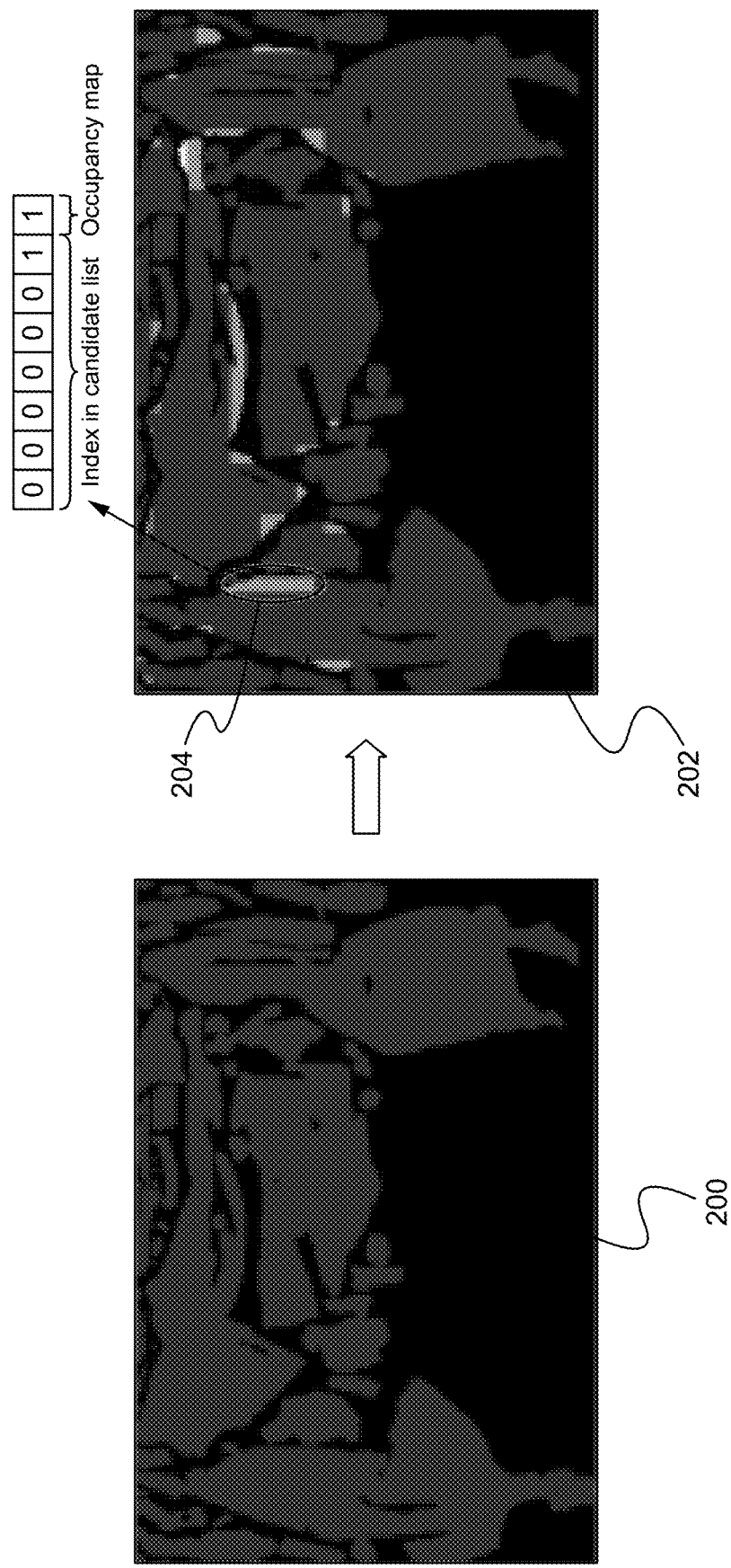
FIG. 2 illustrates occupancy maps according to some embodiments.

FIG. 1 illustrates an image with two overlapping bounding boxes according to some embodiments. The first bounding box 100 is for a first patch 102 (e.g., vertical body shape), and the second bounding box 110 is for a second patch 112 (e.g., horizontal body shape). The circled area 120 includes blocks that belong to the first patch 112 but are also in the second bounding box 100 of the second patch 102 which was placed later. Therefore, to clarify which patch belongs to which bounding box, block2Patch information is sent when encoding. A candidatePatch list specifies that the blocks in the first patch 102 are identified by a "1" and the blocks in the second patch 112 are identified by a "0." In this example, the blocks in the circled area 120 are identified by a "1" since they are part of the first patch 102. FIG. 2 illustrates occupancy maps according to some embodiments. An occupancy map 200 includes gray and black pixels (or any other distinguishing pixels), where the gray pixels represent active pixels for 2D patches from a 3D image, and the black pixels represent inactive or empty pixels. As described herein, some of the bounding boxes for the patches overlap. For patches (or patch segments) that are overlapped by bounding boxes, such as patch segment 204, block2Patch information which indicates which bounding box the pixel or patch (or patch segment) belongs to is sent in the occupancy map 202. For example, the owner of a bounding box is inserted into a candidate list which is added to the upper bits of the luminous channel of a video encoding stream or the occupancy map 202. The occupancy map 202 is encoded as a video.

Figure 3:
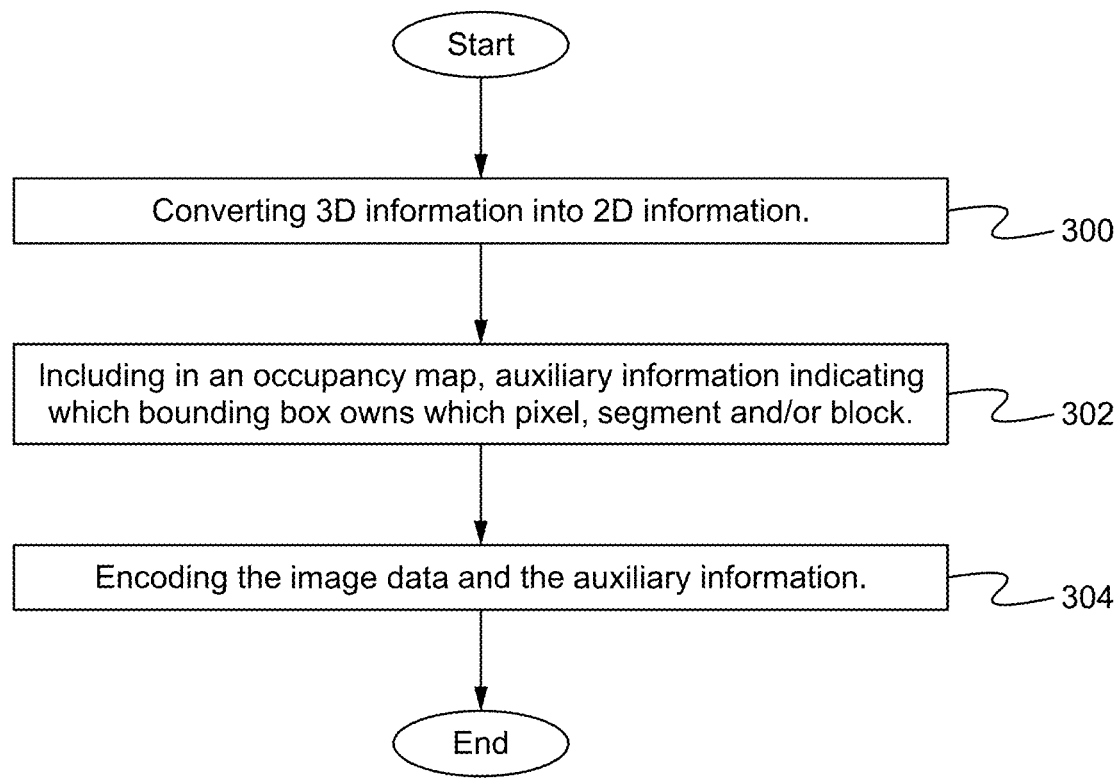
FIG. 3 illustrates a flowchart of a method of point cloud auxiliary information coding according to some embodiments.

FIG. 3 illustrates a flowchart of a method of point cloud auxiliary information coding according to some embodiments. In the step 300, 3D information (e.g., point cloud information) is converted into 2D information. For example, 3D surface patches represent point clouds, and a flexible mapping of 3D patch surface data into 2D canvas images is performed. In the step 302, auxiliary information indicating which bounding box owns which pixel, segment and/or block is included in an occupancy map. For example, for each pixel, an index to a candidate/bounding box is included in the occupancy map. In the step 304, the image data (e.g., 2D information) and the auxiliary information are encoded. The encoding is able to be performed by any video encoder such as HEVC/MPEG or any other video encoder. In some embodiments, additional or fewer steps are implemented. For example, the encoded image information and auxiliary information are able to be decoded to re-generate the point cloud information. Decoding is able to include any standard video decoding methods/implementations including decoding the 2D information and the auxiliary information. In some embodiments, the order of the steps is modified.

Figure 4:
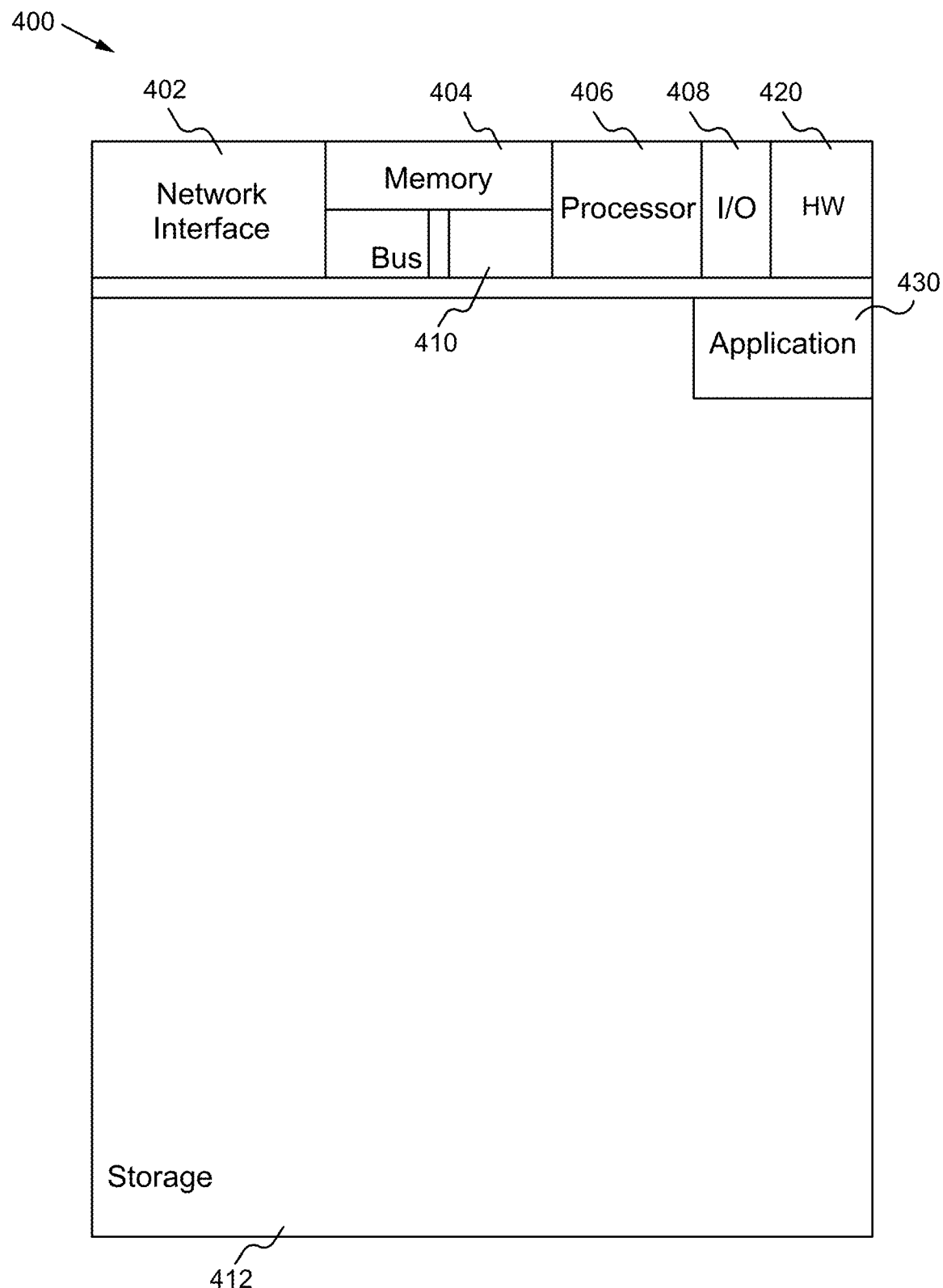
FIG. 4 illustrates a block diagram of an exemplary computing device configured to implement point cloud auxiliary information coding according to some embodiments.

FIG. 4 illustrates a block diagram of an exemplary computing device configured to implement point cloud auxiliary information coding according to some embodiments. The computing device 400 is able to be used to acquire, store, compute, process, communicate and/or display information such as images and videos including 3D content. The computing device 400 is able to implement any of the point cloud coding structure aspects. In general, a hardware structure suitable for implementing the computing device 400 includes a network interface 402, a memory 404, a processor 406, I/O device(s) 408, a bus 410 and a storage device 412. The choice of processor is not critical as long as a suitable processor with sufficient speed is chosen. The memory 404 is able to be any conventional computer memory known in the art. The storage device 412 is able to include a hard drive, CDROM, CDRW, DVD, DVDRW, High Definition disc/drive, ultra-HD drive, flash memory card or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, screen, printer, modem, touchscreen, button interface and other devices. Point cloud auxiliary information coding application(s) 430 used to implement the point cloud auxiliary information coding are likely to be stored in the storage device 412 and memory 404 and processed as applications are typically processed. More or fewer components shown in FIG. 4 are able to be included in the computing device 400. In some embodiments, point cloud auxiliary information coding hardware 420 is included. Although the computing device 400 in FIG. 4 includes applications 430 and hardware 420 for the point cloud auxiliary information coding, the point cloud auxiliary information coding is able to be implemented on a computing device in hardware, firmware, software or any combination thereof. For example, in some embodiments, the point cloud auxiliary information coding applications 430 are programmed in a memory and executed using a processor. In another example, in some embodiments, the point cloud auxiliary information coding hardware 420 is programmed hardware logic including gates specifically designed to implement the point cloud auxiliary information coding.

In some embodiments, the point cloud auxiliary information coding application(s) 430 include several applications and/or modules. In some embodiments, modules include one or more sub-modules as well. In some embodiments, fewer or additional modules are able to be included.

In some embodiments, the point cloud auxiliary information coding hardware 420 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the point cloud auxiliary information coding described herein, a device acquires or receives 3D content and processes and/or sends the content in an optimized manner to enable proper, efficient display of the 3D content. The point cloud auxiliary information coding is able to be implemented with user assistance or automatically without user involvement.

In operation, the point cloud auxiliary information coding more efficiently encodes 3D content. The block2Patch video coding does not restrict the placement of the patches at the encoder side and still has an encoder packing issue. Keeping the block2Patch information is able to be useful for memory reduction and performance improvement.

Although HEVC and MPEG have been described herein, the coding method described herein is able to be implemented with any video coding scheme. The coding method described herein is able to be utilized with a PCC encoder or related applications. In some embodiments, the coding method is implemented in conjunction with or instead of the V-PCC standard.

Some Embodiments of a Point Cloud Auxiliary Information Coding

1. A method programmed in a non-transitory memory of a device comprising:
   converting point cloud information into two dimensional information;
   including auxiliary information related to the point cloud information in an occupancy map; and
   encoding the two dimensional information and the occupancy map including the auxiliary information using a video encoder.
2. The method of clause 1 wherein the auxiliary information includes information to indicate to which bounding box a pixel belongs.
3. The method of clause 2 wherein an indicator indicating an owner of the bounding box is inserted into a candidate list.
4. The method of clause 3 wherein the candidate list is added to upper bits of the occupancy map.
5. The method of clause 3 wherein the candidate list is added to upper bits of a luminous channel of a video coding stream.
6. The method of clause 1 wherein the auxiliary information is only provided when bounding boxes overlap.
7. The method of clause 1 further comprising decoding the two dimensional information and the auxiliary information to regenerate the point cloud information.
8. An apparatus comprising:
   a non-transitory memory for storing an application, the application for:
     converting point cloud information into two dimensional information;
     including auxiliary information related to the point cloud information in an occupancy map; and
     encoding the two dimensional information and the occupancy map including the auxiliary information using a video encoder; and
   a processor coupled to the memory, the processor configured for processing the application.
9. The apparatus of clause 8 wherein the auxiliary information includes information to indicate to which bounding box a pixel belongs.
10. The apparatus of clause 9 wherein an indicator indicating an owner of the bounding box is inserted into a candidate list.
11. The apparatus of clause 10 wherein the candidate list is added to upper bits of the occupancy map.
12. The apparatus of clause 10 wherein the candidate list is added to upper bits of a luminous channel of a video coding stream.
13. The apparatus of clause 8 wherein the auxiliary information is only provided when bounding boxes overlap.
14. The apparatus of clause 8 further comprising decoding the two dimensional information and the auxiliary information to regenerate the point cloud information.
15. A system comprising:
    an encoder configured for:
      converting point cloud information into two dimensional information;
      including auxiliary information related to the point cloud information in an occupancy map; and
      encoding the two dimensional information and the occupancy map including the auxiliary information using a video encoder; and
    a decoder configured for decoding the two dimensional information and the auxiliary information to regenerate the point cloud information.
16. The system of clause 15 wherein the auxiliary information includes information to indicate to which bounding box a pixel belongs.
17. The system of clause 16 wherein an indicator indicating an owner of the bounding box is inserted into a candidate list.
18. The system of clause 17 wherein the candidate list is added to upper bits of the occupancy map.
19. The system of clause 17 wherein the candidate list is added to upper bits of a luminous channel of a video coding stream.
20. The system of clause 16 wherein the auxiliary information is only provided when bounding boxes overlap.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising: converting point cloud information into two dimensional information;
including auxiliary information related to the point cloud information in an occupancy map, wherein the auxiliary information includes information to indicate to which bounding box a pixel belongs;
and encoding the two dimensional information and the occupancy map including the auxiliary information using a video encoder.

2. The method of claim 1, wherein an indicator indicating an owner of the bounding box is inserted into a candidate list.

3. The method of claim 2 wherein the candidate list is added to upper bits of the occupancy map.

4. The method of claim 2 wherein the candidate list is added to upper bits of a luminous channel of a video coding stream.

5. The method of claim 1 wherein the auxiliary information is only provided when bounding boxes overlap.

6. The method of claim 1 further comprising decoding the two dimensional information and the auxiliary information to regenerate the point cloud information.

7. An apparatus comprising: a non-transitory memory for storing an application, the application for: converting point cloud information into two dimensional information;
including auxiliary information related to the point cloud information in an occupancy map, wherein the auxiliary information includes information to indicate to which bounding box a pixel belongs;
and encoding the two dimensional information and the occupancy map including the auxiliary information using a video encoder;
and a processor coupled to the memory, the processor configured for processing the application.

8. The apparatus of claim 7 wherein an indicator indicating an owner of the bounding box is inserted into a candidate list.

9. The apparatus of claim 8 wherein the candidate list is added to upper bits of the occupancy map.

10. The apparatus of claim 8 wherein the candidate list is added to upper hits of a luminous channel of a video coding stream.

11. The apparatus of claim 7 wherein the auxiliary information is only provided when bounding boxes overlap.

12. The apparatus of claim 7 further comprising decoding the two dimensional information and the auxiliary information to regenerate the point cloud information.

13. A system comprising: an encoder configured for: converting point cloud information into two dimensional information;
including auxiliary information related to the point cloud information in an occupancy map, wherein the auxiliary information includes information to indicate to which bounding box a pixel belongs;
and encoding the two dimensional information and the occupancy map including the auxiliary information using a video encoder;
and a decoder configured for decoding the two dimensional information and the auxiliary information to regenerate the point cloud information.

14. The system of claim 13 wherein an indicator indicating an owner of the bounding box is inserted into a candidate list.

15. The system of claim 14 wherein the candidate list is added to upper bits of the occupancy map.

16. The system of claim 14 wherein the candidate list is added to upper bits of a luminous channel of a video coding stream.

17. The system of claim 13 wherein the auxiliary information is only provided when bounding boxes overlap.

* * * * *